G. YOERGER.
HEATER ATTACHMENT FOR GAS BURNERS.
APPLICATION FILED JAN. 28, 1909.
921,778.
Patented May 18, 1909
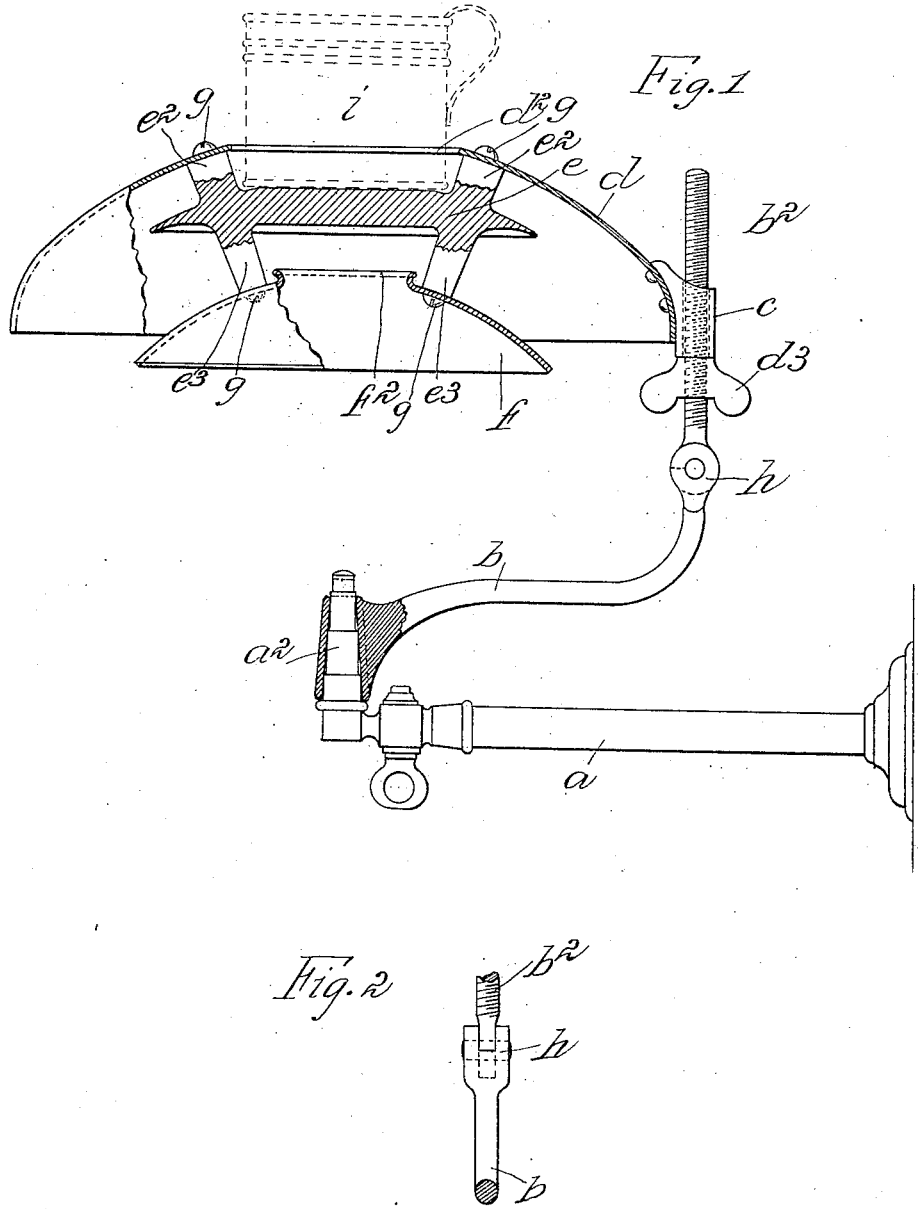

UNITED STATES PATENT OFFICE.

GEORGE YOERGER, OF BROOKLYN, NEW YORK.

HEATER ATTACHMENT FOR GAS-BURNERS.

No. 921,778.  Specification of Letters Patent.  Patented May 18, 1909.

Application filed January 28, 1909. Serial No. 474,673.

*To all whom it may concern:*

Be it known that I, GEORGE YOERGER, a citizen of the United States, and residing at Brooklyn, in the county of Kings and State of New York, have invented certain new and useful Improvements in Heater Attachments for Gas-Burners, of which the following is a specification, such as will enable those skilled in the art to which it appertains to make and use the same.

This invention relates to heater attachments for gas burners; and the object thereof is to provide an improved device of this class which is designed to both store and radiate heat from a gas burner so as to utilize said heat for the purpose of warming a room or compartment; a further object being to provide a device of the class specified which is also used for heating liquids; and with these and other objects in view the invention consists in a device of the class specified constructed as hereinafter described and claimed.

The invention is fully disclosed in the following specification, of which the accompanying drawing forms a part, in which the separate parts of my improvement are designated by suitable reference characters in each of the views, and in which;—

Figure 1 is a side view of an ordinary gas burner or fixture and showing my improvement connected therewith, and;—Fig. 2 a detail view of a part of the construction shown in Fig. 1.

In the drawing forming part of this specification, I have shown at $a$ an ordinary gas fixture device with which is connected an ordinary burner tube or similar device $a^2$, and in the practice of my invention I mount on or connect with the burner tube $a^2$ or that part of the gas fixture with which said tube is connected an arm $b$ which is rotatable on said tube or fixture and which is provided with an upwardly directed member $b^2$ which is preferably screw threaded, and on which is loosely mounted a sleeve $c$ below which is placed a nut $d^3$ by means of which said sleeve may be raised or lowered.

Connected with the sleeve $c$ in any desired manner is a heat deflector and storer $d$ which is made in the form of an ordinary reflector, or convexo-concave in form and provided, in the form of construction shown, with a central opening $d^2$.

Connected with and suspended centrally from the part $d$ is a heat storing device $e$ composed of iron or other suitable metal and which is disk-shaped in form, and suspended from the part $e$ is a reflector device $f$ which is also preferably made in the form of an ordinary reflector and provided with a central opening $f^2$. In the form of construction shown the central member or heat storer $e$ is provided with upwardly directed studs $e^2$ by means of which the part $d$ is connected therewith and downwardly directed studs $e^3$ by means of which the part $f$ is connected therewith, these connections being preferably made by means of screws $g$ as shown in the drawing, and the parts $d$, $e$ and $f$ are spaced relatively to each other so as to permit the hot air and hot gases of combustion to pass freely around or between the parts $e$ and $f$ as well as through the part $f$ and through the opening $d^2$ in the part $d$. I also preferably provide the upwardly directed part $b^2$ of the arm $b$ with a hinge $h$, and with this construction the heater, or that part thereof composed of the parts $d$, $e$ and $f$ may be rotated on the part $b^2$ of the arm $b$ so as to turn said heater proper over the burner as shown in Fig. 1, or away from over said burner as will be readily understood, or the said heater proper may be turned backwardly away from the burner on the hinge $h$ and again turned into position over the burner whenever desired. In Fig. 1 of the drawing I have also indicated a cup or other vessel $i$ which may be used for the purpose of heating small quantities of water or other liquid, and which, in practice, is passed through the opening $d^2$ in the part $d$ and rests on the part $e$, and in this way small quantities of liquids may be quickly and conveniently heated whenever desired.

My invention is not limited to the exact means of connecting the arm $b$ with the burner $a$ as herein shown and described, nor to the exact details of the construction of the heater proper, and various changes therein and modifications thereof may be made, within the scope of the appended claims, without departing from the spirit of my invention or sacrificing its advantages.

Having fully described my invention, what I claim as new and desire to secure by Letters Patent, is:—

1. A heating device for gas burners comprising an arm or support adapted to be connected with the burner or fixture and provided with a vertically arranged member, and a heater proper mounted on said member and vertically adjustable thereon and adapted to be moved into different positions, said heater proper consisting of top, bottom and intermediate members, the top and bottom members being convexo-concave in form, and the bottom member being provided with a central opening.

2. A heating device for gas burners comprising an arm or support adapted to be connected with the burner or fixture and provided with a vertically arranged member, and a heater proper mounted on said member and vertically adjustable thereon and adapted to be moved into different positions, said heater proper consisting of top, bottom and intermediate members, the top and bottom members being convexo-concave in form, and the bottom member being provided with a central opening, the top member being also provided with a central opening through which a vessel may be passed and supported by the intermediate member.

3. A heating attachment for gas burners comprising a support adapted to be connected with the burner or fixture, and a heater proper connected with said support and adapted to be moved into different positions, said heater proper consisting of top, bottom and intermediate members, the bottom member being provided with a central opening, and the intermediate member being composed of a body of metal adapted to receive and store heat, the top member being also provided with a large opening over the intermediate member.

4. A heating attachment for gas burners comprising a support adapted to be rotatably connected with the burner or fixture and comprising a top, bottom and intermediate members spaced so as to permit the ascending gases of combustion to pass between the same, the intermediate member consisting of a metal body adapted to receive and store heat, and the top and bottom members being convexo-concave in form, and said top and bottom members being provided with central openings.

5. A heating attachment for gas burners comprising a support adapted to be rotatably connected with the burner or fixture and comprising a top, bottom and intermediate members spaced so as to permit the ascending gases of combustion to pass between the same, the intermediate member consisting of a metal body adapted to receive and store heat, and the top and bottom members being convexo-concave in form, and said top and bottom members being provided with central openings, and means whereby the attachment may be supported above the burner and adjusted vertically with reference thereto.

6. A heating attachment for gas burners comprising a support adapted to be rotatably connected with the burner or fixture and comprising a top, bottom and intermediate members spaced so as to permit the ascending gases of combustion to pass between the same, the intermediate member consisting of a metal body adapted to receive and store heat, and the top and bottom members being convexo-concave in form, and said top and bottom members being provided with central openings, and means whereby the attachment may be supported above the burner and adjusted vertically with reference thereto and turned in a horizontal plane from over the burner.

7. A heating attachment for gas burners comprising a support adapted to be rotatably connected with the burner or fixture and comprising a top, bottom and intermediate members spaced so as to permit the ascending gases of combustion to pass between the same, the intermediate member consisting of a metal body adapted to receive and store heat, and the top and bottom members being convexo-concave in form, and said top and bottom members being provided with central openings, and means whereby the attachment may be supported over the burner and turned in a vertical plane from its position thereover.

In testimony that I claim the foregoing as my invention I have signed my name in presence of the subscribing witnesses this 27th day of January, 1909.

GEORGE YOERGER.

Witnesses:
  C. E. MULREANY,
  HARRY R. CANFIELD.